Feb. 15, 1966

F. J. CANTALUPO ETAL 3,234,818

VALVE OPERATING MECHANISM

Filed Oct. 30, 1961

INVENTOR.
FRANCIS J. CANTALUPO,
BY JOHN P. DOELGER &
EDMOND T. DeCRAENE.

Byron, Hume, Groen & Clement ATTYS.

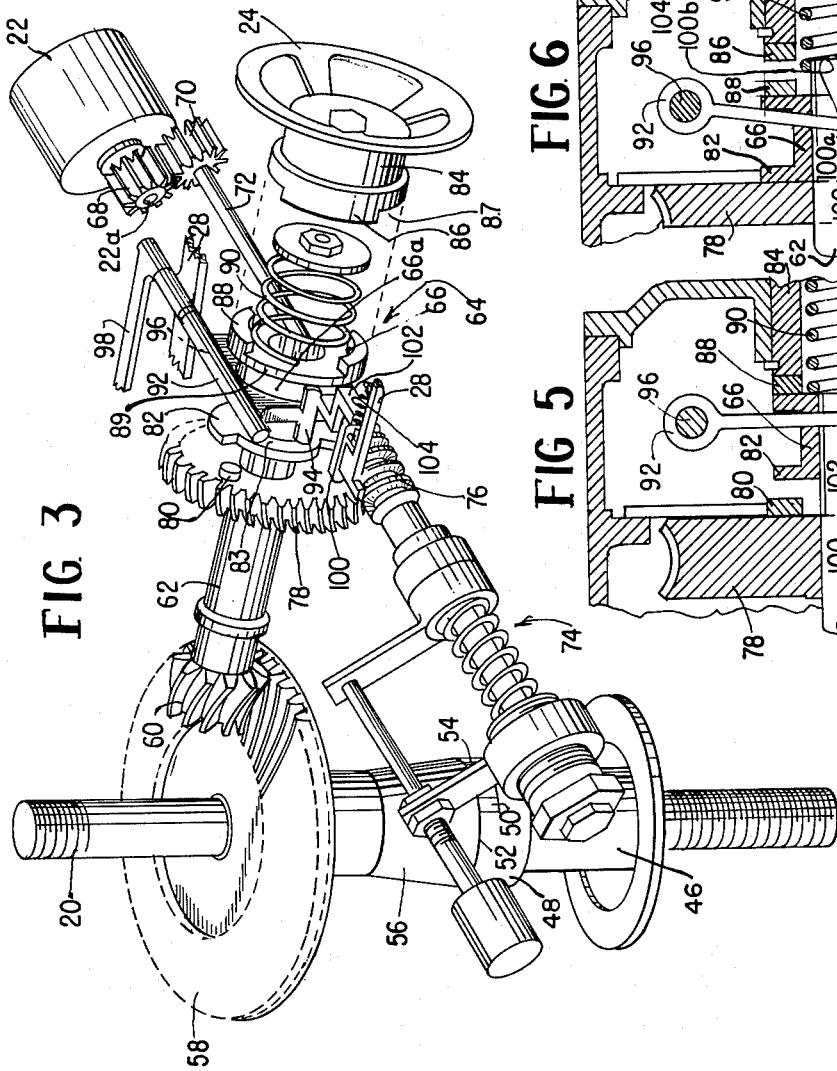

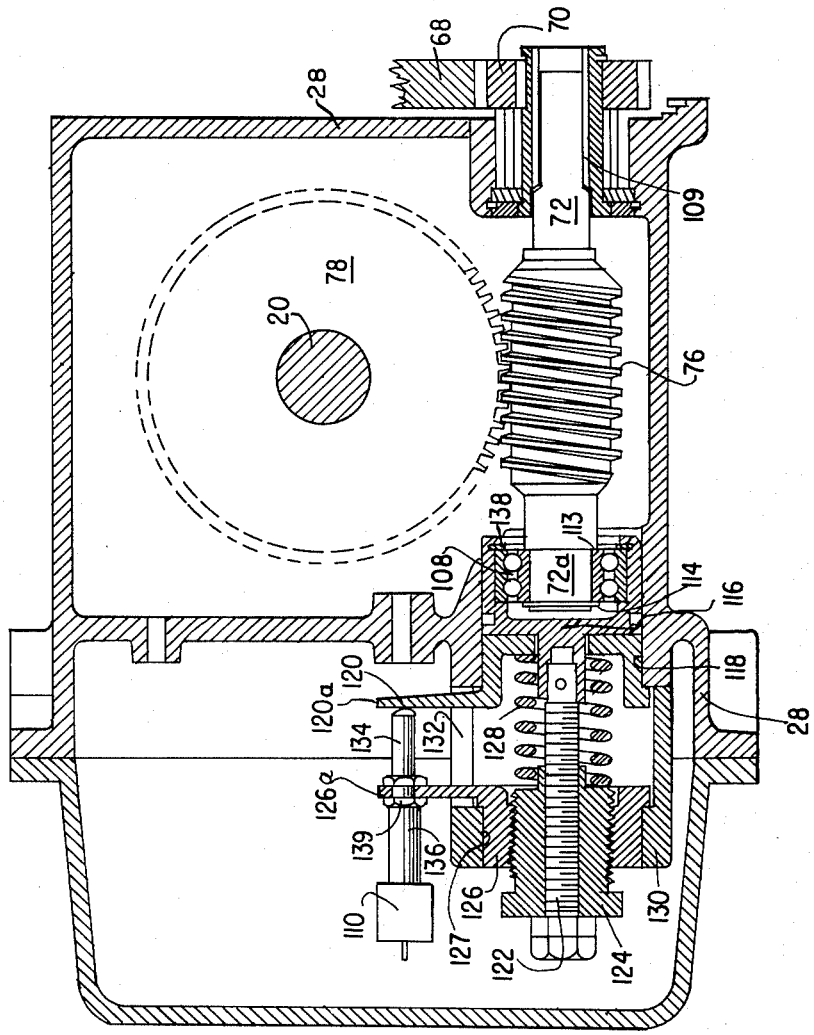

United States Patent Office 3,234,818
Patented Feb. 15, 1966

3,234,818
VALVE OPERATING MECHANISM
Francis J. Cantalupo and John P. Doelger, Chicago, and Edmond P. De Craene, Westchester, Ill., assignors to Crane Co., Chicago, Ill., a corporation of Illinois
Filed Oct. 30, 1961, Ser. No. 148,423
12 Claims. (Cl. 74—625)

The present invention relates to valve operator mechanisms and, more particularly, to mechanisms that are manually operated or are motor operated to control the position of a valve or the like.

It is an object of the present invention to provide a new and improved operating mechanism for a valve or the like.

It is another object of the present invention to provide for a valve or the like a mechanism that is selectively hand operated or motor operated.

It is a further object in accordance with the previous object to provide a mechanism having motor preference.

It is another object of the present invention to provide for a valve or the like an operating mechanism wherein its hand operation is disabled during motor operation.

It is a further object of the present invention to provide for a valve or the like an operator mechanism that is manually conditioned for manual operation yet is automatically conditioned for motor operation incident to energizing of the motor.

It is a further object in accordance with the previous object to provide in the mechanism a new and improved declutching arrangement.

It is yet a further object of the present invention to provide a new and improved valve operating mechanism that is readily connected to prior art valve structures with only minor adaptations.

It is another object of the present invention to provide a valve operating mechanism embodying an adapter assembly which is readily secured to prior art valve structures with a minimum of difficulty.

It is another object in accordance with the previous object to maintain an effective driving connection between the valve mechanism and valve structure notwithstanding misalignment between their operative components.

It is a further object of the present invention to provide for a valve or the like a mechanism that is manually operable at a relatively high speed ratio, as compared with the low speed ratio at which the prior art devices are hand operated.

It is a further object of the present invention to provide for a valve an operator mechanism wherein a worm and worm gear arrangement is located in the drive connection between a motor means and the valve so that a hand wheel device is adapted to drive the valve at a relatively high speed with a minimum of ease, in contrast to manual operation of prior art devices.

It is a further object of the present invention to provide for a valve or the like a mechanism operable selectively by either a motor means that drives the valve at a relatively high gear ratio or a hand wheel means that drives the valve at a relatively low gear ratio.

It is yet another object of the present invention to provide for a valve or the like a mechanism that embodies an arrangement which automatically de-energizes a prime mover upon seating of the valve.

The above and other objects are realized in accordance with the present invention by providing a new and improved valve operating mechanism for a valve or the like. Briefly, the valve operating mechanism functions to seat and unseat the valve in order to control the flow of liquid in a conduit within which the valve is located. The mechanism embodies a manually operable hand wheel and a remotely controlled motor, each of which is adapted to actuate the valve as desired. To condition the mechanism for hand wheel operation, the hand wheel is manually rendered operative, while the mechanism is conditioned for motor operation by the simple expediency of energizing the motor. Accordingly, the mechanism normally has a "motor preference," which can be overridden manually if desired. In this connection, in response to motor energization, the hand wheel is automatically rendered inoperative and the motor is rendered operative. The mechanism is so constructed that the hand wheel is adapted to drive the valve at a relatively high speed with a minimum of ease, in contrast to the low speed at which the prior art devices are hand operated.

The mechanism is readily adaptable to prior art valve constructions and, in this connection, the yoke structure of the prior art valves is used—in contrast to other valve operating mechanisms which can be used with prior art valves only when the entire yoke is changed. The valve operating mechanism is so constructed that an effective driving connection is established between the operating mechanism and the valve, thus permitting installation with liberal alignment tolerances and without a high degree of mechanical skill. In another aspect of the invention, the motor is automatically de-energized when a predetermined amount of resistive torque is offered to the motor, for example, when the valve is seated a predetermined amount. In addition, the output torque of the valve mechanism can be changed by the simple expedient of replacing a readily replaceable component of the mechanism.

The invention, both as to its organization and method of operation, taken with further objects and advantages thereof, will best be understood by reference to the following description taken in connection with the accompanying drawings, in which:

FIG. 3 is a perspective, partially diagrammatical and partially exploded, view of the valve operating mechanism and valve of FIG. 1;

FIG. 5 is an elevational view of the declutching arrangement of FIG. 4, illustrated in its hand wheel position;

FIG. 6 is a view similar to FIG. 5 illustrating the declutching arrangement in its motor position; and FIG. 7 is a fragmentary elevational view of a torque switch device embodied in the mechanism of FIG. 1.

Figure 1:
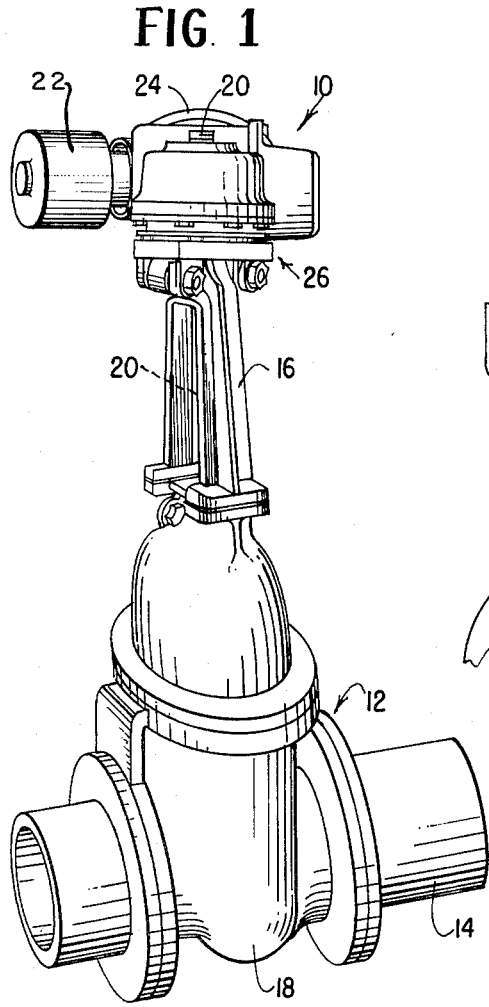
FIG. 1 is a perspective view of a valve operating mechanism embodying the features of the present invention, illustrated as used with a valve.

Referring now to the drawings and in particular to FIG. 1, a valve mechanism embodying the features of the present invention is identified generally by reference numeral 10 and is illustrated as used with a valve or the like 12. The valve operating mechanism 10 operates to open and close the valve 12 which controls the flow of liquid through a conduit 14 in which the valve 12 is located. The valve operating mechanism 10 is mounted at the upper end of a valve yoke 16 that extends upwardly from a valve casing 18. The yoke 16 supports the upper end of a valve stem 20 that moves vertically in response to operation of the mechanism 10. As is well known, a suitable valve gate (not shown) is fixedly secured to the lower end of the valve stem 20 to also be moved vertically within the casing to permit and obstruct flow of the fluid media in the conduit 14.

As will be described in greater detail hereinafter, the valve operating mechanism 10 effects the upward and downward movement of the valve stem 20 by the use of suitable motor means, for example, electric motor 22, or by the use of hand operated means, for example, a hand wheel 24. The valve stem 20 is driven by the hand wheel 24 only when the hand wheel is rendered manually operative, while the valve stem 20 is driven by the electric motor 22 whenever the motor 22 is energized. Hence, the valve operating mechanism 10 normally has a "motor" preference.

In accordance with one of the aspects of the present invention, the valve operating mechanism is adapted to be readily secured to prior art valve structures with a minimum of difficulty without requiring a change of the prior art valve yokes. This is in contract to other valve operating mechanisms which can be used with prior art valves only after the valve yokes have been changed or physically modified. As a matter of fact, the valve 12, which is controlled by the valve mechanism 10 (see FIGS. 1 and 2), is a valve of the prior art type and, as will be observed, the yoke 16 has not in any way been modified.

Figure 2:
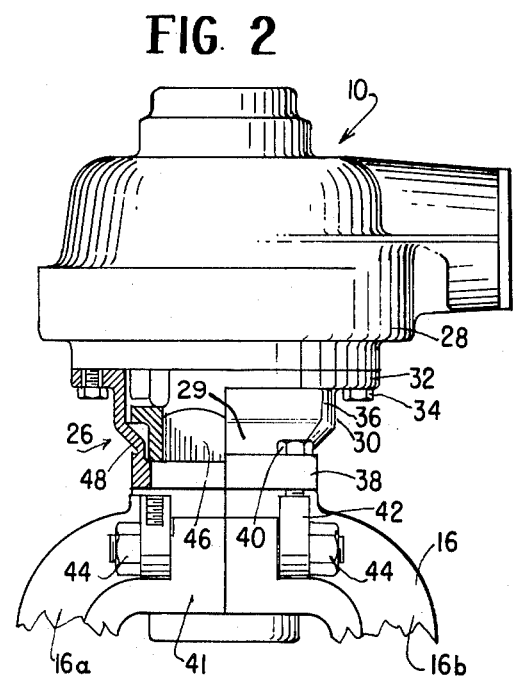
FIG. 2 is a fragmentary elevational view of the valve operating mechanism and valve of FIG. 1.
Figure 4:
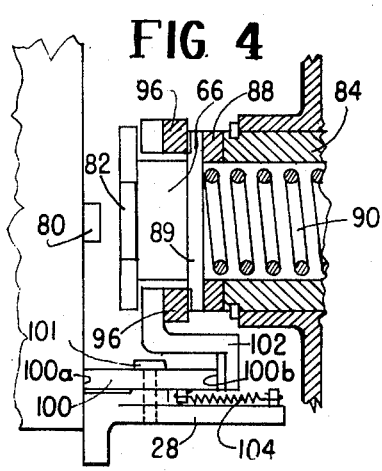
FIG. 4 is a fragmentary plan view of a declutching arrangement embodied in the mechanism of FIG. 1.

In order that the mechanism 10 be readily usable with prior art valves, of which valve 12 is typical, the mechanism 10 embodies a yoke adapter assembly 26 which is fixedly secured to the upper end of the yoke 16 to coact with the valve stem 20. As best illustrated in FIGS. 1 and 2, the yoke adapter assembly 26 physically connects the yoke 16 with the main body of the casing 28 of the mechanism 10 and, further, connects the valve stem 20 with the operative components of the mechanism 10. Specifically, the assembly 26 includes a yoke adapter 30 that spaces the main body of the casing 28 of the mechanism 10 from the upper horizontal end of the yoke 16. The yoke adapter 30 is hollow, as shown in FIG. 2, to accommodate the operative components of the mechanism 10 and the valve stem 20. It includes an outwardly extending annular flange 32 which is suitably apertured to accommodate fasteners 34 that extend into the main body of the casing 28. Depending downwardly from the flange 32 is a generally cylindrical body 36 in which is provided openings 29. In contrast to the upper annular flange 32, the body 36 terminates in a generally square shaped flange 38, the corners of which are suitably apertured to accommodate fasteners 40. It will be appreciated that the openings 29 in the body 36 permit the fasteners 40 to be disposed and tightened in the corner apertures. As best seen in FIG. 2, the fasteners 40 coact with lugs 42, pairs of which are respectively secured to bosses 41 by nut and bolt arrangements 44 that serve to maintain the left and right legs 16a and 16b of the valve yoke 16 in assembled relation.

Similar to the prior art yokes, the upper ends of the yoke legs 16a and 16b are suitably recessed to accommodate the cylindrical bearing portion of a yoke sleeve 46. The yoke sleeve 46 is, hence, rotatably held by the upper end of the yoke 16 and is provided with a threaded axial bore through which extends the valve stem 20. The yoke sleeve 46 extends upwardly above the yoke 16 and is multi-sided to accommodate a wrench or a prior art hand wheel.

However, as shown best in FIG. 2, the yoke adapter assembly 26 includes a yoke sleeve adapter 48 embodying a lower end that mates with the yoke sleeve 46, in the same general way as the prior art hand wheels. Hence, when the yoke sleeve adapter 48 is rotated by the mechanism 10, the yoke sleeve 46 is also rotated to effect the vertical movement of the valve stem 20. The yoke sleeve adapter 48 is sleeve-like in construction and, as seen in FIG. 3, includes an upper end having a peripheral slot 50 thereby defining a jaw 52. The jaw 52 of the yoke sleeve adapter 48 coacts with a jaw 54 of a drive sleeve 56 which is fixedly secured to a spiral cut bevel gear 58. The bevel gear 58 is driven by suitable gearing, described below, under the control of either the motor 22 or the hand wheel 24.

The jaws 52 and 54 and the slots 50 are so dimensioned that upon each reversal of the motor 22 or the hand wheel 24, a lost motion of substantial magnitude (about one-fourth turn of drive sleeve 56) is obtained before the jaws 52 and 54 coact, thus imparting an impact to the driven valve yoke sleeve 46 to overcome static friction or a tendency to stick, and at the same time this lost motion permits the motor to attain full speed due to free rotation for a significant number of turns before the load of valve operation is applied.

In accordance with an aspect of the present invention, the valve operating mechanism 10 is quickly and expediently mounted to the yoke 16. In contrast to prior art valve operator mechanisms, the adapter assembly 26 is so constructed that alignment of the valve operating mechanism 10 relative to the yoke 16 is not critical. Hence, whereas it was necessary in prior art mechanisms to align the driving structure of the operating mechanism with the valve stem with great precision and close tolerances, this alignment procedure is entirely obviated because of the construction of the adapter assembly 26. This desirable feature results from the use of the coacting jaws 52 and 54 which can be mated in a less critical manner without impairing the driving connection between the yoke sleeve adapter 48 and the drive sleeve 56. Hence, if any misalignment exists between the yoke adapter assembly 26 and the yoke or any misalignment exists between the yoke sleeve adapter 48 and the drive sleeve 56, the valve stem 20 is nonetheless satisfactorily driven by the yoke sleeve 46.

It should be understood that by embodying the adapter assembly 26 in the valve operating mechanism, the mechanism is readily usable with prior art valves, without modifying their yokes. Because of this fact, the valve operating mechanism 10 is required to handle torque only. Inasmuch as the yoke of the prior art valve is not modified, it performs its designed function of handling thrust. Accordingly, the valve operating mechanism 10 is not designed to handle thrust, thereby simplifying the design of the mechanism 10.

Moreover, by virtue of the use of the adapter assembly 26, it will be appreciated that the entire valve operating mechanism 10 can be quickly and easily removed from the yoke 16 by the simple expediency of removing the bolt arrangements 34. In the event the mechanism 10 is rendered inoperative, it can be bodily removed to expose the yoke sleeve 46. Consequently, another hand wheel of the prior art type or a wrench can be secured to the yoke sleeve 46 to move the valve stem 20 vertically for the purpose of opening or closing the valve gate.

Considering now more specifically the constructional details of the valve operating mechanism 10, attention is invited to FIG. 3. As clearly illustrated, the bevel gear 58 is driven by a pinion 60 located at the end of a clutch shaft 62 which is either driven by the motor 22 or the hand wheel 24. Thus, in accordance with a feature of the present invention, the motor 22 or the hand wheel 24 is selectively connected to the clutch shaft 62 under the control of a declutching arrangement 64. The declutching arrangement 64 comprises a clutch 66 slidably splined on the clutch shaft 62 so as to move axially relative to but rotate with the clutch shaft 62. Specifically, the clutch 66 moves between a motor operative position (see FIG. 6), wherein the motor 22 is drivingly connected to the clutch shaft 62 to drive the valve stem 20 and a hand operative position (see FIG. 5), wherein the hand wheel 24 is drivingly connected to the clutch shaft 62 to drive the valve stem 20.

More specifically, assuming that the valve operating mechanism 10 is conditioned for motor operation, the motor 22 is energized by a suitable control circuit in response to actuation of a remotely positioned switch or button (not shown). As illustrated in FIG. 3, the output shaft 22a of the motor 22 is provided with a helical gear 68 that is drivingly connected to a helical gear 70 suitably secured to the end of a worm shaft 72. The worm shaft 72 is supported from the casing 28 and, to this end, suitable bearings (not shown in FIG. 3) are employed to permit rotation of the shaft 72. In addition, for a purpose described in greater detail hereinafter, the worm shaft 72 is supported so that it is movable axially to operate a torque switch device 74. In any event, as illustrated, a worm 76 is located intermediate the ends of the worm shaft 72 and is in driving engagement with a worm wheel 78 freely supported on the clutch shaft 62. It should be appreciated that the worm wheel 78 is not drivingly connected to the clutch shaft 62, but is suitably restrained from movement along the clutch shaft 62 by suitable means so that engagement between the worm 76 and worm wheel 78 is at all times assured.

Assuming that the declutching arrangement 64 is in its motor operative position (see FIG. 6), the clutch 66 is in clutching engagement with the worm wheel 78. Particularly, the pins 80 on the right face (as viewed in FIG. 3) of the worm wheel 78 coact with the lugs 82 formed on the left collar 83 of the clutch 66. Accordingly, the clutch 66 is rotated under the control of the worm wheel 78 and, inasmuch as the clutch 66 is slidably splined to the clutch shaft 62, the shaft 62 is likewise rotated. Consequently, the pinion 60 drives the beveled gear 58 which, in turn, causes the rotation of the yoke sleeve 46 to effect the vertical movement of the valve stem 20.

On the other hand, assuming that the valve operating mechanism 10 is conditioned for hand wheel operation (as a result of manual operation of the declutching arrangement 64), the hand wheel 24 is rotated manually to effect the rotation of the clutch shaft 62. Particularly, the hand wheel 24 is suitably connected to a hub 84 having at its left side (as viewed in FIG. 3) clutch lugs 86 defined by slots 87. With the declutching arrangement 64 in its hand operative position (see FIG. 5), the clutch 66 is in clutching engagement with the hub 84. Specifically, the lugs 86 on the hub 84 coact with lugs 88 located on the right face (as viewed in FIG. 3) of the right collar 89 of the clutch 66. Accordingly, the clutch 66 is rotated under the control of the hand wheel 24 and, inasmuch as the clutch 66 is slidably splined to the clutch shaft 62, the shaft 62 is likewise rotated. As previously described, the rotation of the clutch shaft 62 causes the valve stem 20 to be moved vertically.

It will be appreciated that the position of the clutch 66 determines whether or not the clutch shaft 62 is driven by the motor 22 or the hand wheel 24. The position of the clutch 66 is, of course, controlled partially by the operation of the declutching arrangement 64, described hereinafter. In the absence of manual actuation of the declutching arrangement 64, the clutch 66 is maintained in its motor operative position (see FIG. 6) by a coiled spring 90 disposed between the hub 84 and the right collar 89 of the clutch 66. Hence, driving engagement is obtained between the worm wheel 78 and the clutch 66, irrespective of whether or not the motor 22 is energized. However, whenever the motor 22 is, in fact, energized, the clutch shaft 62 is rotated and the valve stem 20 is moved vertically unless, of course, the clutch 66 is manually held in hand wheel position by means of the lever 98.

As previously indicated, the valve operating mechanism 10 normally has a "motor preference," with a manual override. In this connection, the declutching arrangement 64 is manually actuable to position and hold the clutch 66 in its hand wheel position (see FIG. 5)—as long as the motor 22 is not energized and its associated worm wheel 78 is not rotated. However, when the motor 22 is energized and the worm wheel 78 rotates, the declutching arrangement 64 automatically operates to permit the coil spring 90 to move the clutch 66 from its hand operative position (see FIG. 5) to its motor operative position (see FIG. 6). As a result, a driving connection is obtained between the motor 22 and the valve stem 20.

Considering now the declutching arrangement in greater detail, attention is invited particularly to FIGURES 3, 4, 5, and 6. The clutch 66 has a recessed cylindrical center section 66a which coacts with a fork 92. The fork 92 has a pair of legs 94 which are conformably shaped to and mate with the recessed center section 66a. As shown, the lower ends of the legs 94 extend between the left collar 83 and the right collar 89, whereby in response to pivotal movement of the fork 92, the legs coact with the collar 89 to effect axial movement of the clutch 66. As clearly shown, the fork 92 is mounted on a shaft 96 which is rotatably supported from the casing 28, the right end of the shaft 96 (as viewed in FIG. 3) being suitably attached to a manually operable handle 98.

In conditioning the valve operating mechanism 10 for manual operation, the handle 98 is actuated to displace the fork 92 to the right (as viewed in FIG. 3) into its hand operative position (see FIG. 5). Incident to rightward axial movement of the clutch 66 during which the spring 90 is compressed, a pawl or trip arm 100 is rendered operative to retain the clutch 66 in its hand operative position, i.e., restrain the clutch 66 against the force of the spring 90. More specifically, the pawl 100 is pivotally mounted from the casing 28 by a pin 101 and is designed to coact with or latch a Z-shaped arm 102 which is fixedly secured to the left leg 94 (as viewed in FIG. 3) of the fork 92. As shown, the right end (as viewed in FIG. 3) of the pawl 100 is suitably apertured to accommodate one end of a biasing spring 104, the other end of which is suitably secured to the casing 28. It will be appreciated that the spring 104 urges the pawl 100 into a position parallel to the clutch shaft 62—so that, when the handle 98 is actuated, the pawl 100 is urged into alignment with the Z-shaped arm 102 to latch the clutch 66 in its hand operative position.

More particularly, incident to actuation of the handle 98 (and movement of the clutch 66 into its hand operative position), the Z-shaped arm 102 moves from the position shown in FIG. 6 to the position shown in FIG. 5. Consequently, the arm 102 moves out of engagement with the side of the pawl 100, whereupon the pawl 100 is urged by the spring 104 into a position parallel to the clutch shaft 62 (see FIG. 5). In the illustrated position, the left tip 100a of the pawl 100 (as seen in FIGS. 3 and 5) is disposed adjacent the right face of the worm wheel 78, while the right tip 100b of the pawl 100 is disposed adjacent the Z-shaped arm 102. Accordingly, when the lever 98 is manually released, the left tip 100a of the pawl 100 abuts against the worm wheel 78, while the right tip 100b of the pawl 100 abuts against the Z-shaped arm 102, whereby the fork 92 and the clutch 66 are held in their hand operative positions (see FIG. 5). Thus, even though the spring 90 urges the clutch 66 toward its motor operative position, the pawl 100 effectively latches the fork 92 and the clutch 66 against the force of the coil spring 90.

With the clutch 66 latched by the pawl 100, the hand wheel 24 is directly drivingly connected to the clutch shaft 62 via the declutching arrangement 64 to move the valve stem 20 vertically. Hence, the valve 12 can be opened and closed manually under the control of the hand wheel 24. During and after manual actuation of the hand wheel 24, the clutch 66 is maintained in its hand operated position (see FIG. 5) under the control of the pawl 100. It should be emphasized that when the mechanism 10 is conditioned for hand wheel operation (see FIG. 5), the left tip 100a of the pawl 100 abuts the right face (as viewed in FIG. 3) of the worm wheel 78.

As previously suggested, the valve operating mechanism 10 normally has a "motor preference" with a manual override which specifically means that whenever the motor 22 is energized by the control circuit (not shown), the driving connection between the hand wheel 24 and the valve stem 20 is automatically broken and a driving connection between the motor 22 and the valve stem 20 is automatically established unless the clutch 66 is maintained manually in its hand wheel position under the control of the handle 98. More specifically, when a person stationed at the valve decides that the motor should not have preference, he can override the "motor preference" by the simple expedient of manually holding lever 98 in position to keep the clutch 66 disengaged from the worm gear 78 and engaged with the hand wheel 24. In this case, if the motor circuit is energized, the worm gear 78 turns freely with no connection to the stem 20 until the motor circuit is broken or the clutch lever 98 is released. If it be assumed that the mechanism 10 is conditioned for hand operation and the motor 22 is energized, the worm shaft 72, the worm 76, and the worm wheel 78 all rotate. Inasmuch as the left tip 100a of the pawl 100 abuts against the worm wheel 78, the tip 100a is frictionally displaced from its latched position, shown in FIG. 5. As a result, the clutch 66 is moved from its hand operative position to its motor operative position by the spring 90. More particularly, as the pawl 100 is displaced by the rotating worm wheel 78, the right tip 100b of the pawl 100 is moved out of engagement and alignment with the end of the Z-shaped arm 102, with the result that the Z-shaped arm, the fork 92, and the clutch 66 are unlatched, i.e., are no longer restrained by the pawl 100. Consequently, the force of the spring 90 overrides the force of the pawl-biasing spring 104 and the clutch 66 is urged leftwardly toward its motor operative position (FIG. 6) under the control of the spring 90. As previously described, the worm wheel 78 and the clutch 66 are clutched together so that a driving connection is obtained between the motor 22 and the valve stem 20. As illustrated clearly in FIG. 6, with the clutch 66 in its unlatched, motor operative position, the pawl 100 is in a non-parallel or inclined position relative to the clutch shaft 62 and, accordingly, is non-aligned relative to the end of the Z-shaped arm 102.

When the valve operating mechanism 10 is conditioned for motor operation, it will be appreciated that the worm wheel 78 rotates whenever the motor 22 is energized. In order to avoid wearing down of the left tip 100a of the pawl 100, the pawl 100 and the Z-shaped arm 102 are so constructed that the Z-shaped arm 102 maintains the pawl 100 in the inclined position shown in FIG. 6. Particularly, the end of the Z-shaped arm 102 engages the side of the pawl 100, thereby to slightly space the tip 100a from the worm wheel 78, as illustrated in FIG. 6.

When it is desired to condition the valve operating mechanism 10 for manual operation, the handle 98 is manually actuated to pivot the fork 92. As previously discussed, the pivotally moving fork 92 and associated Z-shaped arm 102 move to the right (as seen in FIG. 3) to displace the clutch 66 rightwardly against the force of the coil spring 90. As the end of the Z-shaped arm 102 moves into its extreme right position, it moves rightwardly of the right tip 100b of the pawl 100 as viewed in FIGS. 5 and 6, thereby permitting the pawl 100 to be moved by its biasing spring 104 into a position parallel to the clutch shaft 62 and in alignment with the end of the Z-shaped arm 102. In order to assure that the left tip 100a of the pawl 100 does not engage the worm wheel 78 and thereby prevent axial alignment of the pawl 100 with the Z-shaped arm, the pivotal connection for the pawl 100 is oversized. Specifically, the pawl 100 is provided with an elongated slot 106 through which the casing pivot pin 101 extends, so that the pawl 100 is slidable, as well as rotatable, relative to the pivot pin 101.

Hence, when the fork 92 and its associated Z-shaped arm 102 are in their extreme right-hand operative positions (not shown), the biasing spring 104 urges the pawl 100 to the right—so that the pivot pin 101 coacts with the left end of the slot 106. The slot 106 and the pawl 100 are so dimensioned that the left tip 100a of the pawl 100 is slightly spaced from the right face of the worm wheel 78. Thus, axial alignment of the pawl 100 with the Z-shaped arm 102 is readily permitted without interference from the worm wheel 78. When the handle 98 is released, the spring 90 urges the clutch 66, the fork 92, and the Z-shaped arm 102 toward the left toward their motor operative positions. However, since the pawl 100 is in its parallel position in alignment with the end of the Z-shaped arm 102, the Z-shaped arm 102 engages the tip 100b of the pawl 100 and moves the pawl 100 to the left. After the Z-shaped arm 102 and the pawl 100 move together for a short distance, the tip 100a of the pawl 100 engages the worm wheel 78, thereby to latch the clutch 106 in its hand wheel position (see FIG. 5). As a result of the slight sliding movement of the pawl 100, the pivot pin 101 is located in the middle of the slot 106, not in engagement with the left end of the slot 106 as previously described. In any event, with the pawl 100 in its latched position, the valve operating mechanism 10 is again conditioned for hand wheel operation. The mechanism 10 remains in this condition until the motor 22 is again energized, at which time the declutching arrangement 64 automatically disengages the hand wheel 24 from the clutch shaft 62 and engages the motor 22 with the clutch shaft 62 to effect a driving connection between the valve stem 20 and the motor 22.

In accordance with an aspect of the present invention, the mechanism 10 is so constructed that the torque derived from the back-up action of the valve stem does not interfere in any way with the declutching arrangement 64. For example, in certain prior art arrangements in which the worm and worm gear construction is associated with the clutch arrangement, the clutch frequently becomes locked up with the worm and worm gear construction. This action results because of the transmission of the torque through the clutch to the worm and worm gear construction. With the motor drivingly connected to the worm and worm gear construction, the clutch becomes "locked up" to the worm and worm gear construction. Hence, if it is desired to condition the mechanism for hand wheel operation after the valve seats, great difficulty is experienced in manually actuating the declutching arrangement embodied in these prior art mechanism. However, any such declutching difficulty does not exist in the present valve operating mechanism 10 and, more specifically, the declutching arrangement 64 is never "locked up" with the worm and worm wheel construction. This result is achieved by using a relatively large lead angle on the threads of the worm 76, so that relative movement is permitted between the worm wheel 78 and the worm shaft 72 which is drivingly connected to the motor 22. Expressed in another way, this result is achieved by using a lead angle on the threads of the worm 76 that is greater than the friction angle of the mating worm 76 and worm wheel 78 so that there is no locking action between the worm shaft 72 and the worm wheel 78.

Thus, assuming that it is desired to automatically close the valve 12, the motor 22 is energized. As the motor 22 seats the valve, a torque load (derived from the back-up or stalling action of the valve stem) is applied through the clutch 66 to the worm wheel 78. When the valve is fully seated, the motor 22 is de-energized, but because the worm 76 is drivingly connected to the motor, the worm 76 is relatively immobilized. However, because of the interrelationship of the above described lead angle and friction angle, the worm 76 can be driven by the worm wheel 78, and the clutch 66 is at no time locked up to the worm wheel 78, with the result that the operation of the declutching arrangement 64 is at no time impaired.

From the foregoing description, it will be appreciated that in the event of a power failure or specifically of a motor failure, the valve stem 20 of the valve 12 can be manually operated by the hand wheel 24. In contrast to the prior art valve operating mechanisms, the mechanism 10 is manually operable directly through a relatively low gear ratio that is best suited for specific service conditions. Specifically, when the mechanism 10 is conditioned for hand wheel operation, the hand wheel 24 is directly connected to the clutch shaft 62 which is drivingly connected to the valve stem 20 via the pinion 60 and bevel gear 58. Unlike prior art mechanisms, no worm and worm gear arrangement is disposed in the driving connection between the hand wheel and the valve stem.

Accordingly, instead of obtaining a gear ratio of approximately 50–1—as in the case of the prior art mechanism which do not embody speed increasing gearing—a gear ratio of approximately 4–1 is obtained with the present valve operating mechanism 10. Although the gear ratio is only 4–1, the diameter of the hand wheel 24 relative to the clutch shaft 62 is relatively large, with the result that a substantial mechanical advantage is available to the operator. Thus, the hand wheel 24 is adapted to drive the valve stem 20 with the same relative ease as prior art mechanisms, without using any speed increasing gearing but at a relatively higher speed than those prior art devices in which a worm and worm wheel arrangement is disposed in the driving connection between the hand wheel and the valve.

In order to assure that the valve gate (not shown) is completely seated in its closed position before the motor 22 is de-energized and, further, to assure that the valve gate (not shown) is not backed up against the valve casing 18 with excessive force, there is embodied in the mechanisms which do not embody speed increasing gearing—a matically in FIG. 3 and in detail in FIG. 7. The torque switch device 74, accordingly, operates to de-energize the motor 22 when a torque load is developed and offered to the motor 22. The torque switch device 74 is operative irrespective of whether the motor 22 operates in a first direction to seat the valve gate or in an opposite direction to move the valve gate adjacent its open position. As is well known, the seating of the valve gate causes the valve stem 20, the yoke sleeve 46, the bevel gear 58, the clutch shaft 62, the clutch 66, the worm wheel 78, the worm 76, the worm shaft 72, and the motor to lock up. On the other hand, if the valve gate moves beyond its open position and is backed up by the casing, the above described components are likewise locked up. In either case, there is applied to the motor 22 torque load which, if it were not for the torque switch device 74, would cause the motor to stall and, in all probability, to burn out. In any event, the torque switch device 74 is present to de-energize the motor 22 after a predetermined torque load is built up, thereby to prevent the motor 22 from being damaged and the valve seat from being overloaded, and in this connection, the torque switch device 74 is associated with the worm shaft 72 which, of course, is driven by the motor 22.

Let it be assumed that the valve gas (not shown) is being seated under the control of the motor 22. When the valve gate is in the process of seating, a torque load is developed because of the coaction of the valve gate with its valve seat in the casing 18. Accordingly, resistance is offered to the valve stem 20, the clutch shaft 62, and the worm wheel 78. As a result, the worm 76 which is being driven by the motor 22, is unable to drive or rotate the worm wheel 78. However, because of the construction of the worm 76 and worm wheel 78, the worm 76 nonetheless continues to rotate. However, instead of rotating the frozen or stalled worm wheel 78, the worm 76 moves tangentially of the worm wheel 78, i.e., the worm 76 and the worm shaft 72 move axially. This action is possible because, as previously stated, the worm shaft 72 is both rotatably and axially movably supported from the casing 28 and, to this end, suitable bearings 108 and 109 (see FIG. 7), respectively, support the left and right ends of the worm shaft 72. In any event, after the worm shaft 72 has moved a predetermined distance (and let it be assumed that the shaft 72 moves to the left, as viewed in FIG. 7), the torque switch device 74 operates to open a switch 110 which is located in the energizing circuit of the motor 22.

Considering now more specifically FIG. 7, as the left end of the worm shaft 72 moves to the left, a shoulder 113 on the shaft 72 displaces to the left a double row ball bearing 108 which is disposed about the reduced end 72a of the shaft 72. The bearing 108 is carried by a bearing retainer 116 and, accordingly, the bearing retainer 116 moves to the left, the bearing retainer 116 being slidably mounted within a bore 118 in the casing 28. As shown, the bearing retainer 116 abuts against a right retaining guide 120 which is also slidably mounted within the bore 118 and, hence, the right retaining guide 120 moves to the left. As clearly shown, the retainer 116 is mechanically connected via stud 122 and adjusting nut 124 to a left retaining guide 126 which is slidably mounted in a bore 127 defined in a housing 130 suitably secured to the casing 28. However, because of the sliding relationship of the stud 122 and the nut 124, only the stud 122 moves to the left. In any event, as the right retaining guide 120 moves to the left, it compresses a spring 128 disposed between the right and left retaining guides 120 and 126.

As clearly illustrated, the right and left retaining guides 120 and 126 have upwardly extending fingers 120a and 126a respectively which extend through a slot 132 defined at the top of the housing 130. The retaining guides 120 and 126 (and their associated fingers 120a and 126a) are movable relative to each other and, further, are movable relative to the housing 130—depending upon the amount of torque load and the direction of rotation of the motor 22 (and, hence, the direction of movement of the worm shaft 72).

Returning to the leftwardly moving retaining guide 120, it slides to the left in the bore 118 under the control of the bearing retainer 116, the bearing 108, and the worm shaft 72. After moving a relatively short distance, the finger 120a of the retaining guide 120 coacts with an actuator 134 of the switch 110, the switch 110 and its associated support 136 being adjustably supported on the finger 126a of the left retaining guide 126. When the worm shaft 72 moves the right retaining guide 120 a predetermined distance, the actuator 134 opens the switch 110, thereby opening the energizing circuit for the motor 22. As a result, the motor is de-energized and the rotation and axial movement of the worm shaft 72 is arrested. The motor remains in an off condition until it is desired to open the valve, at which time suitable control switches or buttons are actuated to close another energizing circuit for the motor to drive it in a direction reverse to that described above.

Assuming that the valve gate moves beyond its normally opened position and backs up against its casing 18, a resistive force is applied to the valve stem 20, clutch shaft 62, and worm wheel 78. As in the above described case, the worm 76 continues to rotate and moves tangentially relative to the worm wheel 78—but, inasmuch as the motor is rotated in a direction opposite to that previously considered, the worm 76 and worm shaft 72 move to the right as viewed in FIG. 7. Consequently, the left end 72a of the worm shaft 72 moves to the right, with the result that the bearing 108 is also moved to the right by a retaining ring 114 that is disposed in an annular groove (not shown) in the end 72a to coact with the left side of the bearing 108. In its rightward movement, the bearing 108 abuts against a retaining ring 138 which is disposed in an annular groove defined in the right end of the slidable bearing retainer 116. As a result, the bearing retainer 116 slides to the right in the bore 118 away from the right retaining ring 120. Consequently, the stud 122, the adjusting nut 124, and the left retaining guide 126 are all pulled to the right against the force of the spring 128 which is compressed. Accordingly, instead of the finger 120a of the right retaining guide 120 moving to the left to operate the actuator 134, the finger 126a of the retaining guide 126 moves to the right, thereby causing the actuator 134 to coact with the finger 120a. After the worm shaft 72 moves the left retaining guide 126 a predetermined distance, the actuator 134 opens the switch 110 to open the energizing circuit for the motor 22. Thus, the motor is de-energized and the rotation and axial movement of the worm shaft 72 is arrested.

It will be understood that the torque switch device 74 can be preset to operate at different torque loads by adjusting the position of the adjusting nut 124. Specifically, by adjusting the position of the adjusting nut 124 relative to the left retaining guide 126, the spring 128 is compressed different amounts. Accordingly, different amounts of force can be offered to the axially moving worm shaft 72, so that the switch 110 will be actuated at any desired torque load. Specifically, if it is desired to operate the torque switch device 74 at a higher resistive torque, the adjusting nut 124 is adjusted so that the spring 128 is contracted a greater amount. This adjustment, as can be seen by reference to FIG. 7, does not in any way affect the spacing between the retaining guides 120 and 126 and, hence, the distance that the worm shaft 72 must move axially remains the same. However, since the spring 128 is more compressed, a higher torque load must be built up before the worm shaft 72 moves the predetermined distance.

It will also be appreciated that the distance the worm shaft 72 is required to move before the switch 110 is actuated can also be varied by adjusting the adjustable mounting means 139 associated with the switch support 136 and retaining guide 126.

In accordance with a feature of the torque switch device 74, the output torque range of the valve operating mechanism 10 can be changed by the expedient of modifying the torque switch device 74. For example, by use of one type of spring 128, the valve operating mechanism can be designed to have an output torque range of 0–300 ft. lbs., for example. By substituting a different spring for the coil spring 128, the output torque range of the mechanism 10 can be changed to 300–600 ft. lbs., for example. The actual removal and replacement of the springs is accomplished quickly and easily and, as can be readily appreciated, requires only the disassembly of the adjusting nut 124 and associated stud 122.

It should be understood that the torque switch device 74 may embody either a single switch 110 having double pole contacts or two separate single pole switches (not shown), both of which arrangements can be wired to control circuits that control the forward and reverse rotation of the motor 22.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. The combination of: a valve assembly including a valve stem, yoke means, and driving means supported by the yoke means to be in driving engagement with said valve stem; a detachable adapter assembly including adapter means supported by said yoke means, and an adapter arrangement drivingly connected to said driving means and including a clutch element; and a valve operator mechanism comprising means including a clutch member coacting with said clutch element, said clutch element and member providing a connection notwithstanding misalignment of said adapter arrangement and said last mentioned means, shaft means drivingly connected to said last-named, hand wheel means adapted to be drivingly connected to said shaft means, motor means adapted to be drivingly connected to said shaft means, and a clutching arrangement adapted to interconnect one of said last two-mentioned means to said shaft means.

2. The combination of: a valve assembly including a valve casing, a valve gate coacting with the casing, a valve stem connected to said valve gate, yoke means supported on said casing, and rotatable driving means supported by said yoke means and coacting with said valve stem to effect its movement; an adapter assembly including adapter means suitably secured to said yoke means, an adapter arrangement coacting with said rotatable driving means for driving said valve stem, said arrangement including clutch elements; and a valve operator mechanism including adapter driving means including clutch means coacting with said clutch elements, said clutch means and elements providing a driving connection notwithstanding misalignment between said adapter arrangement and adapter driving means, gearing drivingly connected to said adapter driving means, shaft means connected to said gearing, clutch means drivingly connected to said shaft means and movable between a hand wheel position and a motor position, hand wheel means for driving said clutch means when in said hand wheel position, and motor means for driving said clutch means when in said motor position.

3. In a valve operator mechanism for controlling a valve, said mechanism comprising a casing, manually operable means, motor means connected to a gearing arrangement, first clutching means connected to said manually operable means and adapted to be operated when said manually operable means is operated, second clutching means connected to said gearing arrangement and adapted to be operated when said motor means is operated, a reciprocable clutch means adapted to be in clutching engagement with but one of said clutching means at a time, means for manually effecting engagement of said first clutching means and said reciprocable clutch means, and trip means supported from said casing automatically responsive to the operation of said motor means to permit said reciprocable clutch means to move toward clutching engagement with said second clutching means, said last named means including movable tip means which is biased into frictional engagement with a substantially smooth and continuous portion of said gearing arrangement when the motor means is not operative and which is actuated by frictional forces resulting from operation of said portion of said gearing arrangement when the motor means is operative.

4. In a valve operator mechanism for controlling a valve, said mechanism comprising a casing, manually operable means, motor means connected to a gearing arrangement, first clutching means connected to said manually operable means and adapted to be operated when said manually operable means is operated, second clutching means connected to said gearing arrangement and adapted to be operated when said motor means is operated, a reciprocable clutch means adapted to be in clutching engagement with but one of said clutching means at a time, means for manually effecting engagement of said first clutching means and said reciprocable clutch means, and means supported from said casing automatically responsive to the operation of said motor means to permit said reciprocable clutch means to move toward clutching engagement with said second clutching means, said last named means including a movable trip means having a tip means biased into frictional engagement with a substantially smooth and continuous portion of said gearing arrangement so that when the motor means is inoperative said trip means maintains said reciprocable clutch means out of engagement with said second clutching means and when the motor means is operative said trip means is frictionally displaced by said portion of the gearing arrangement to permit said reciprocable clutch means to engage said second clutching means.

5. In a valve operator mechanism for controlling a valve, said mechanism comprising a casing, manually operable means, motor means connected to a gearing arrangement, first clutching means connected to said manually operable means and adapted to be operated when said manually operable means is operated, second clutching means connected to said gearing arrangement and adapted to be operated when said motor means is operated, a reciprocable clutch means adapted to be in clutching engagement with but one of said clutching means at a time, biasing means normally urging said reciprocable clutch means into clutching engagement with said second clutching means, rockable yoke means coacting with said clutch means and manually operable to effect de-clutching of said clutch means and said second clutching means and clutching of said clutch means and said first clutching means, and movable trip means supported from said casing including a tip means and an end means adapted to engage, respectively, a substantially smooth and continuous portion of said gearing arrangement and said rockable yoke means, to maintain said clutch means and second clutching means out of engagement, the tip means being biased into frictional engagement with said portion of the gearing arrangement under the control of said biasing means when said end means engages said rockable yoke means, but being displaced by the frictional force generated by movement of said portion of the gearing mechanism in response to operation of the motor means to cause disengagement of said end means and rockable yoke means to permit engagement of said clutch means and second clutching means under the control of said biasing means.

6. In a valve operator mechanism for controlling a valve, said mechanism comprising a casing, manually operable means, motor means connected to a gearing arrangement, first clutching means connected to said manually operable means and adapted to be operated when said manually operable means is operated, second clutching means connected to said gearing arrangement and adapted to be operated when said motor means is operated, a reciprocable clutch means adapted to be in clutching engagement with but one of said clutching means at a time, biasing means normally urging said reciprocable clutch means into clutching engagement with said second clutching means, rockable yoke means coacting with said clutch means and manually operable to effect de-clutching of said clutch means and said second clutching means and clutching of said clutch means and said first clutching means, and movable trip means supported from said casing including a tip means and an end means adapted to engage, respectively, a substantially smooth and continuous portion of said gearing arrangement and said rockable yoke means, to maintain said clutch means and second clutching means out of engagement, the tip means being biased into frictional engagement with said portion of the gearing arrangement under the control of said biasing means when said end means engages said rockable yoke means, but being displaced by the frictional force generated by movement of said portion of the gearing mechanism in response to operation of the motor means to cause disengagement of said end means and rockable yoke means to permit engagement of said clutch means and second clutching means under the control of said biasing means, said trip means being connected to a resilient means and having an oversized support opening to permit the tip means and end means to be moved under the control of the resilient means into respective alignment with said gearing portion and rockable yoke means when the rockable yoke means is manually operative to effect the engagement of said clutch means and said first clutching means.

7. The mechanism of claim 6 wherein there is additionally provided latch means to maintain the tip means out of engagement with said portion of the gearing arrangement when the clutch means is in clutching engagement with said second clutching means.

8. In a valve operator mechanism for controlling a valve, said mechanism comprising a casing, manually operable means, motor means connected to a gearing arrangement, first clutching means connected to said manually operable means and adapted to be operated when said manually operable means is operated, second clutching means connected to said gearing arrangement and adapted to be operated when said motor means is operated, a reciprocable clutch means adapted to be in clutching engagement with but one of said clutching means at a time, means for manually effecting engagement of said first clutching means and said reciprocable clutch means, and trip means supported from said casing automatically responsibe to the operation of said motor means to permit said reciprocable clutch means to move toward clutching engaging with said second clutching means, said last named means including a first member connected to said reciprocable clutch means, spring biasing means normally urging said reciprocable clutch means into clutching engagement with said second clutching means, and a movable second member adapted to interconnect said first member and a substantially smooth and continuous portion of said gearing arrangement, said second member having a tip, which when in its interconnected position, is in direct frictional engagement with said portion of the gearing arrangement under the control of said spring biasing means, the tip being displaced when said portion of the gearing arrangement moves in response to operation of said motor means to permit said spring biasing means to move said reciprocable clutch means into engagement with said second clutching means.

9. The mechanism of claim 8 wherein said movable second member includes an end adapted to engage said first member, the displacement of said tip in response to movement of said portion of the gearing arrangement causing displacement of said end relative to the first member to effect the unlatching of said reciprocable clutch means under the control of said spring biasing means.

10. The mechanism of claim 9 wherein there is additionally provided a resilient means connected to the second member to move said second member into a latching position when said reciprocable clutch means is manually moved into engagement with said first clutching means so that the tip and end of the second member are respectively aligned with said portion of the gearing mechanism and said first member.

11. The mechanism of claim 10 wherein said second member includes means defining an oversized support opening to permit the tip and end to become respectively aligned with said portion of the gearing arrangement and the first member when the reciprocable clutch means is manually moved into engagement with said first clutching means.

12. The mechanism of claim 11 wherein there is additionally provide latch means for maintaining the tip of the second member out of engagement with said portion of the gearing arrangement when the clutch means is in clutching engagement with said second clutching means.

References Cited by the Examiner

UNITED STATES PATENTS

| | | | |
|---|---|---|---|
| 1,713,402 | 5/1929 | Shivers | 251—130 |
| 1,856,927 | 5/1932 | Panish | 251—134 |
| 1,966,209 | 7/1934 | Miller | 251—130 |
| 2,598,062 | 5/1952 | Krecan | 251—134 |
| 2,621,543 | 12/1952 | Rossman | 74—625 |
| 2,703,991 | 3/1955 | Kron | 74—625 |
| 2,745,294 | 5/1956 | Kron | 74—625 |
| 2,916,947 | 12/1959 | Morrell | 74—625 |
| 2,954,703 | 10/1960 | Morrell | 251—130 X |

DON A. WAITE, *Primary Examiner.*

M. CAREY NELSON, ISADOR WEIL, *Examiners.*